United States Patent
Barrière et al.

(10) Patent No.: US 12,168,726 B2
(45) Date of Patent: Dec. 17, 2024

(54) ANTIOXIDANT COMPOSITIONS

(71) Applicant: SI GROUP USA (USAA), LLC, Danbury, CT (US)

(72) Inventors: Clément Barrière, Whitefield (GB); Maurice Power, Manchester (GB)

(73) Assignee: SI Group, Inc.

( * ) Notice: Subject to any disclaimer, the term of this patent is extended or adjusted under 35 U.S.C. 154(b) by 490 days.

(21) Appl. No.: 17/297,822

(22) PCT Filed: Nov. 27, 2019

(86) PCT No.: PCT/EP2019/082789
§ 371 (c)(1),
(2) Date: May 27, 2021

(87) PCT Pub. No.: WO2020/109410
PCT Pub. Date: Jun. 4, 2020

(65) Prior Publication Data
US 2022/0025155 A1    Jan. 27, 2022

(30) Foreign Application Priority Data
Nov. 30, 2018  (GB) .................................... 1819574

(51) Int. Cl.
C08K 5/46        (2006.01)
C08K 5/134       (2006.01)
C08K 5/18        (2006.01)
C08K 5/375       (2006.01)

(52) U.S. Cl.
CPC .............. C08K 5/46 (2013.01); C08K 5/1345 (2013.01); C08K 5/18 (2013.01); C08K 5/375 (2013.01); C08K 2201/014 (2013.01)

(58) Field of Classification Search
None
See application file for complete search history.

(56) References Cited

U.S. PATENT DOCUMENTS

| | | | |
|---|---|---|---|
| 3,214,397 A | 10/1965 | Cox | |
| 3,655,559 A | 4/1972 | Holt | |
| 4,010,211 A | 3/1977 | Preston et al. | |
| 4,135,042 A | 1/1979 | Lickei et al. | |
| 4,265,783 A | 5/1981 | Hinze | |
| 4,275,173 A * | 6/1981 | Hinze | C08K 5/00 521/128 |
| 4,444,676 A * | 4/1984 | Statton | C08K 5/13 524/83 |
| 4,824,601 A | 4/1989 | Franklin | |
| 4,839,405 A * | 6/1989 | Speelman | C08K 5/29 524/99 |
| 5,143,943 A | 9/1992 | Suhoza et al. | |
| 5,156,762 A | 10/1992 | Suhoza et al. | |
| 5,166,185 A | 11/1992 | House et al. | |
| 5,219,892 A | 6/1993 | Suhoza | |
| 5,672,752 A | 9/1997 | Lai et al. | |
| 5,750,787 A | 5/1998 | Lai et al. | |
| 5,869,565 A | 2/1999 | Clauss | |
| 5,925,600 A | 7/1999 | Atherton | |
| 6,232,376 B1 * | 5/2001 | Tsukada | C08K 5/3435 524/99 |
| 6,569,927 B1 * | 5/2003 | Gelbin | C08K 5/18 524/508 |
| 6,646,035 B2 | 11/2003 | Koch et al. | |

(Continued)

FOREIGN PATENT DOCUMENTS

| | | |
|---|---|---|
| AU | 2003265080 | 4/2004 |
| CA | 2615339 | 3/2016 |

(Continued)

OTHER PUBLICATIONS

International Search Report and Written Opinion for PCT/EP2019/082789 dated Mar. 3, 2020, 15 pages.
Ciba IRGANOX L 135; Safety Data Sheet, Chiba Specialty Chemicals Inc. Dec. 28, 1999, 5 pages.
Ciba IRGANOX 1135; Phenolic Primary Antioxidant for Processing and Long-Term Thermal Stabilization, Chiba Specialty Chemicals Inc. Oct. 1999, 2 pages.
Ciba IRGANOX 5057; Aminic Antioxidant for Processing and Long-Term Thermal Stabilization, Chiba Specialty Chemicals Inc. Oct. 1999, 2 pages.
Greene et al., Size-exclusion chromatography method for characterizing low-molecular-mass antioxidant lubricant additives, Journal of Chromatography A, 841, 1991; 45-54.

*Primary Examiner* — Satya B Sastri
(74) *Attorney, Agent, or Firm* — Dority & Manning, P.A.

(57) ABSTRACT

The invention provides a stabilising composition for polymeric materials, comprising: a. a first derivatised phenolic antioxidant; b. at least one secondary arylamine having the formula (I): NHRyRx wherein: the or each R, which may be the same or different, independently denotes an optionally substituted hydrocarbyl group; x and y are each independently from 0 to 5 provided that at least one of x and y is at least 1; and provided that at least one R is an optionally substituted hydrocarbyl group having at least 9 carbon atoms; and c. one or more antioxidant boosters independently selected from: i. a second derivatised phenolic antioxidant having lower steric hindrance than the first derivatised phenolic antioxidant; ii. a hindered amine; iii. an optionally substituted phenothiazine; and also the use of the stabilising composition for stabilising polyol and/or polyurethane; and a stabilised composition comprising a polyol and/or polyurethane and the aforementioned low emission and anti-scorch stabilising composition.

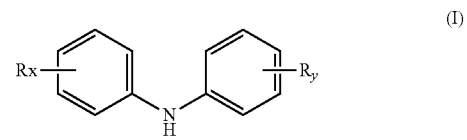

(I)

24 Claims, No Drawings

(56) References Cited

U.S. PATENT DOCUMENTS

| | | |
|---|---|---|
| 6,676,849 B2 | 1/2004 | Demassa |
| 6,858,697 B2 | 2/2005 | Mayorga et al. |
| 6,881,774 B2 | 4/2005 | Schrinner et al. |
| 7,101,948 B2 | 9/2006 | Mayorga et al. |
| 7,247,658 B2 | 7/2007 | Ragsdale et al. |
| 7,297,746 B2 | 11/2007 | Rosen et al. |
| 7,579,306 B2 | 8/2009 | Costello et al. |
| 7,767,729 B2 | 8/2010 | Ashmore et al. |
| 7,790,660 B2 | 9/2010 | Carey et al. |
| 7,816,308 B2 | 10/2010 | Duyck et al. |
| 7,838,703 B2 | 11/2010 | Ma et al. |
| 7,928,045 B2 | 4/2011 | Dong et al. |
| 7,960,318 B2 | 6/2011 | Kamano et al. |
| 7,960,322 B2 | 6/2011 | Boffa et al. |
| 8,017,805 B2 | 9/2011 | Nalesnik |
| 8,110,532 B2 | 2/2012 | Dong |
| 8,193,129 B2 | 6/2012 | Tagawa et al. |
| 8,227,387 B2 | 7/2012 | Tagawa et al. |
| 8,227,388 B2 | 7/2012 | Tagawa et al. |
| 8,232,233 B2 | 7/2012 | Tagawa et al. |
| 8,236,740 B2 | 8/2012 | Tagawa et al. |
| 8,247,360 B2 | 8/2012 | Tagawa et al. |
| 8,299,006 B2 | 10/2012 | Tagawa et al. |
| 8,445,178 B2 | 5/2013 | Park et al. |
| 8,481,657 B2 | 7/2013 | Edel et al. |
| 8,524,815 B2 | 9/2013 | Siddhamalli et al. |
| 8,623,798 B2 | 1/2014 | Cherpeck et al. |
| 8,642,684 B2 | 2/2014 | Linder et al. |
| 8,716,359 B2 | 5/2014 | Demassa |
| 8,716,379 B2 | 5/2014 | Siddhamalli et al. |
| 8,722,595 B2 | 5/2014 | Kamano et al. |
| 8,734,953 B2 | 5/2014 | Sablayrolles et al. |
| 8,741,824 B2 | 6/2014 | Malandro et al. |
| 8,748,357 B2 | 6/2014 | Habeeb et al. |
| 8,829,087 B2 | 9/2014 | Onishi et al. |
| 9,012,386 B2 | 4/2015 | Saita et al. |
| 9,029,443 B2 | 5/2015 | Siddhamalli et al. |
| 9,254,624 B2 | 2/2016 | Calkins |
| 9,309,366 B2 | 4/2016 | Powell et al. |
| 9,425,404 B2 | 8/2016 | Apanius |
| 9,428,601 B2 | 8/2016 | Ahn et al. |
| 9,458,380 B2 | 10/2016 | Fischer et al. |
| 9,481,775 B2 | 11/2016 | Demassa |
| 9,506,007 B2 | 11/2016 | Houten et al. |
| 9,567,545 B2 | 2/2017 | Mizuki et al. |
| 9,650,587 B2 | 5/2017 | Ivancic et al. |
| 9,752,092 B2 | 9/2017 | Qian |
| 9,765,256 B2 | 9/2017 | Afanasiev et al. |
| 9,856,364 B2 | 1/2018 | Mayo |
| 9,890,346 B2 | 2/2018 | Rowland |
| 9,926,487 B2 | 3/2018 | Afanasiev et al. |
| 9,969,864 B2 | 5/2018 | Wolfgang et al. |
| 10,053,620 B2 | 8/2018 | Afanasiev et al. |
| 10,113,052 B2 | 10/2018 | Fischer et al. |
| 10,113,103 B2 | 10/2018 | Afanasiev et al. |
| 10,160,718 B2 | 12/2018 | Boone et al. |
| 10,160,845 B2 | 12/2018 | Boone et al. |
| 10,167,252 B2 | 1/2019 | Boone et al. |
| 10,214,631 B2 | 2/2019 | Pfaendner et al. |
| 10,233,298 B2 | 3/2019 | Kleschzewski et al. |
| 10,260,017 B2 | 4/2019 | Boone et al. |
| 10,287,418 B2 | 5/2019 | Boone et al. |
| 10,308,783 B2 | 6/2019 | Chen et al. |
| 10,407,562 B2 | 9/2019 | Boone et al. |
| 10,428,009 B2 | 10/2019 | Boone et al. |
| 10,472,456 B2 | 11/2019 | Dries et al. |
| 10,487,043 B2 | 11/2019 | Rowland |
| 10,487,289 B2 | 11/2019 | Burns et al. |
| 10,611,719 B2 | 4/2020 | Boone et al. |
| 10,704,009 B2 | 7/2020 | Miller et al. |
| 10,808,197 B2 | 10/2020 | Rowland et al. |
| 10,974,417 B2 | 4/2021 | Tijhuis et al. |
| 11,034,907 B2 | 6/2021 | Shinji et al. |
| 11,066,620 B2 | 7/2021 | Hoey et al. |
| 11,084,909 B2 | 8/2021 | Zhoe et al. |
| 11,136,535 B2 | 10/2021 | Miracle et al. |
| 11,180,631 B2 | 11/2021 | Hill et al. |
| 11,261,403 B2 | 3/2022 | Qin et al. |
| 2004/0171711 A1 | 9/2004 | Takano et al. |
| 2006/0009366 A1 | 1/2006 | Sant et al. |
| 2006/0122073 A1 | 6/2006 | Hewette |
| 2006/0201056 A1 | 9/2006 | Jordan |
| 2007/0158625 A1 | 7/2007 | Bron et al. |
| 2007/0179069 A1 | 8/2007 | Burgo et al. |
| 2007/0190873 A1 | 8/2007 | Batchelor et al. |
| 2007/0240615 A1* | 10/2007 | Tsuda .................. C09K 23/42 106/287.23 |
| 2008/0048157 A1 | 2/2008 | Bron et al. |
| 2008/0146473 A1 | 6/2008 | Van Leeuwen et al. |
| 2008/0237555 A1 | 10/2008 | Bron et al. |
| 2008/0318814 A1 | 12/2008 | Gatto et al. |
| 2009/0011961 A1 | 1/2009 | Dong et al. |
| 2009/0298731 A1 | 12/2009 | Housel et al. |
| 2010/0081591 A1 | 4/2010 | Yamaguchi et al. |
| 2010/0160191 A1 | 6/2010 | Butke et al. |
| 2010/0286004 A1 | 11/2010 | Gatto et al. |
| 2011/0030269 A1 | 2/2011 | Chasan et al. |
| 2011/0230579 A1 | 9/2011 | Demassa |
| 2012/0042856 A1 | 2/2012 | Harley et al. |
| 2012/0193572 A1 | 8/2012 | Mackay |
| 2013/0181199 A1 | 7/2013 | Apanius et al. |
| 2014/0017494 A1 | 1/2014 | Liu et al. |
| 2014/0107000 A1 | 4/2014 | Ivancic et al. |
| 2015/0045263 A1 | 2/2015 | Butke et al. |
| 2015/0094244 A1 | 4/2015 | Yamaguchi et al. |
| 2017/0051128 A1 | 2/2017 | Hill et al. |
| 2017/0073497 A1* | 3/2017 | Zahalka ................. C08K 5/005 |
| 2017/0210898 A1 | 7/2017 | Sour et al. |
| 2018/0026562 A1 | 1/2018 | Hashimoto et al. |
| 2018/0265623 A1 | 9/2018 | Kleszewski et al. |
| 2018/0273873 A1 | 9/2018 | Marsh et al. |
| 2019/0127526 A1 | 5/2019 | Farng et al. |
| 2019/0127656 A1 | 5/2019 | Farng et al. |
| 2019/0144776 A1 | 5/2019 | Famg et al. |
| 2019/0233605 A1 | 8/2019 | Chen et al. |
| 2020/0190324 A1 | 6/2020 | Gubbels |
| 2020/0165188 A1 | 8/2020 | Lock |
| 2020/0299604 A1 | 9/2020 | Hoey et al. |
| 2020/0299605 A1 | 9/2020 | Oliver et al. |
| 2020/0299606 A1 | 9/2020 | Housel et al. |
| 2020/0339727 A1 | 10/2020 | Kumar et al. |
| 2020/0407658 A1 | 12/2020 | Rowland |
| 2021/0087489 A1 | 3/2021 | Hoey et al. |

FOREIGN PATENT DOCUMENTS

| | | |
|---|---|---|
| CN | 1247737 | 5/2005 |
| CN | 1990839 | 2/2009 |
| CN | 101432405 | 5/2009 |
| CN | 101724487 | 6/2010 |
| CN | 101218330 | 3/2011 |
| CN | 101525470 | 2/2012 |
| CN | 101240128 | 6/2012 |
| CN | 101484560 | 3/2013 |
| CN | 102964827 | 3/2013 |
| CN | 102977595 | 3/2013 |
| CN | 102993690 | 3/2013 |
| CN | 102993691 | 3/2013 |
| CN | 102993728 | 3/2013 |
| CN | 102993729 | 3/2013 |
| CN | 103013296 | 4/2013 |
| CN | 103013627 | 4/2013 |
| CN | 103289207 | 9/2013 |
| CN | 103467706 | 12/2013 |
| CN | 103554807 | 2/2014 |
| CN | 103589074 | 2/2014 |
| CN | 102964824 | 7/2014 |
| CN | 104059717 | 9/2014 |
| CN | 104130823 | 11/2014 |
| CN | 104388166 | 3/2015 |
| CN | 102911456 | 4/2015 |
| CN | 104479327 | 4/2015 |
| CN | 104497461 | 4/2015 |
| CN | 104592450 | 5/2015 |

(56) References Cited

FOREIGN PATENT DOCUMENTS

| | | |
|---|---|---|
| CN | 104610711 | 5/2015 |
| CN | 102952336 | 7/2015 |
| CN | 104762032 | 7/2015 |
| CN | 104861666 | 8/2015 |
| CN | 105111971 | 12/2015 |
| CN | 105131413 | 12/2015 |
| CN | 105238015 | 1/2016 |
| CN | 105295406 | 2/2016 |
| CN | 105295407 | 2/2016 |
| CN | 105385025 | 3/2016 |
| CN | 105440580 | 3/2016 |
| CN | 105542247 | 5/2016 |
| CN | 105801964 | 7/2016 |
| CN | 106566457 | 4/2017 |
| CN | 106632963 | 5/2017 |
| CN | 106633702 | 5/2017 |
| CN | 106750124 | 5/2017 |
| CN | 106944142 | 7/2017 |
| CN | 106978236 | 7/2017 |
| CN | 107163447 | 9/2017 |
| CN | 107384536 | 11/2017 |
| CN | 107501516 | 12/2017 |
| CN | 107540937 | 1/2018 |
| CN | 107974029 | 5/2018 |
| CN | 108003602 | 5/2018 |
| CN | 108047418 | 5/2018 |
| CN | 108084392 | 5/2018 |
| CN | 108102069 | 6/2018 |
| CN | 108148264 | 6/2018 |
| CN | 108178912 | 6/2018 |
| CN | 108264627 | 7/2018 |
| CN | 108409583 | 8/2018 |
| CN | 108454200 | 8/2018 |
| CN | 108570344 | 9/2018 |
| CN | 108641794 | 10/2018 |
| CN | 108948449 | 12/2018 |
| CN | 108948481 | 12/2018 |
| CN | 109135875 | 1/2019 |
| CN | 109280262 | 1/2019 |
| CN | 109456558 | 3/2019 |
| CN | 109694460 | 4/2019 |
| CN | 109705302 | 5/2019 |
| CN | 109749692 | 5/2019 |
| CN | 109867943 | 6/2019 |
| CN | 109867945 | 6/2019 |
| CN | 109942822 | 6/2019 |
| CN | 110106327 | 8/2019 |
| CN | 110691766 | 1/2020 |
| CN | 110691767 | 1/2020 |
| CN | 110691769 | 1/2020 |
| CN | 110691770 | 1/2020 |
| CN | 110747041 | 2/2020 |
| CN | 110791076 | 2/2020 |
| CN | 110862759 | 3/2020 |
| CN | 111087705 | 5/2020 |
| CN | 111269564 | 6/2020 |
| CN | 111454419 | 7/2020 |
| CN | 111647383 | 9/2020 |
| CN | 111978686 | 11/2020 |
| CN | 212283986 | 1/2021 |
| CN | 112442413 | 3/2021 |
| CN | 112718007 | 4/2021 |
| CN | 113004150 | 6/2021 |
| EP | 0122989 A1 | 10/1984 |
| EP | 0556612 | 2/1992 |
| EP | 1170296 | 1/2002 |
| EP | 1853684 | 11/2007 |
| EP | 1878784 | 1/2008 |
| EP | 2077315 | 7/2009 |
| EP | 3634938 | 4/2020 |
| EP | 3634939 | 4/2020 |
| EP | 3634940 | 4/2020 |
| EP | 3634941 | 4/2020 |
| GB | 2234253 | 1/1991 |
| JP | 5162306 | 3/2013 |
| JP | 5976836 | 8/2016 |
| JP | 6574390 | 9/2019 |
| JP | 6599255 | 10/2019 |
| KR | 2008103588 | 4/2010 |
| KR | 101319684 | 10/2013 |
| KR | 20150067479 | 6/2015 |
| RU | 2687970 | 5/2019 |
| WO | WO2008075344 | 6/2008 |
| WO | 2010/059316 A1 | 5/2010 |
| WO | 2013/109529 A1 | 7/2013 |
| WO | WO2015126279 | 8/2015 |

* cited by examiner

ANTIOXIDANT COMPOSITIONS

CROSS-REFERENCE TO RELATED APPLICATIONS

This application is a 371 national-stage application of International PCT Application No. PCT/EP2019/082789, filed Nov. 27, 2019, which claims priority to United Kingdom Patent Application No. 1819574.3, filed Nov. 30, 2018, all of which are incorporated herein by reference in their entirety.

The present invention relates to antioxidant compositions. The antioxidant compositions are, in particular though not exclusively, useful for the stabilisation of polyols and polyurethanes, including polyurethane foams.

Polyurethanes constitute a class of polymers with a range of structures, properties and applications. They all have carbamate or urethane linkages (—NH—C(=O)—O—) and can be made by reacting isocyanates with polyols. They can be tailored according to the choice of isocyanate and polyol, the presence of other component(s), and the reaction conditions. Polyurethanes include thermoplastic materials and thermosetting materials, and are used to produce flexible and rigid foams, coatings, fibres, moulded products, elastomeric components, seals and adhesives, amongst other products.

Preparation or processing of the polyurethanes can cause them to degrade. The main cause of degradation, as with many other organic materials, involves a free radical autoxidation cycle. The formation of free radicals can be triggered or enhanced by exposure to heat, or reaction of the polymer with other components or impurities.

This type of polymer degradation is often referred to as scorch. Scorch may be detected in a polymer product, for example a polyurethane foam, by the appearance of darker regions in the polymer and is a degradation phenomenon associated with the large exotherm of the urethane polymerisation reaction.

Antioxidants can be used to break the degradation cycle, thus reducing the amount of scorch. Some antioxidants, known as primary antioxidants, are designed to react with peroxy radicals. Other antioxidants, known as secondary antioxidants, are designed to react with hydroperoxides.

Types of primary antioxidants include sterically hindered phenols and secondary arylamines, e.g. as disclosed in U.S. Pat. No. 4,824,601. It is known to use these two types in combination for the stabilisation of polyurethanes. For example, Ciba Specialty Chemicals have marketed blends of the sterically hindered phenol IRGANOX™ 1135, having the following structure wherein R denotes $C_7$ to $C_9$ alkyl:

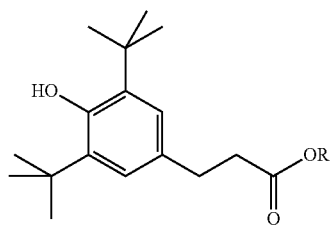

with the secondary arylamine designated by CAS 68411-46-1 (a mixture of derivatised arylamines and a reaction product of diphenylamine, diisobutylene and isobutylene), having the following structure wherein each R independently denotes butyl, octyl, other alkyl chains, or H:

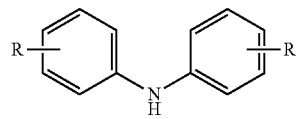

Unfortunately, these and other blends exhibit fogging issues.

WO2015132087 discloses a stabilising composition for polymeric materials, in particular polyurethane, comprising at least one secondary arylamine having the following formula:

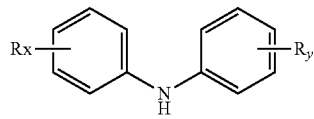

wherein the or each R, which may be the same or different, independently denotes an optionally substituted higher aliphatic hydrocarbyl group; x and y are each independently from 0 to 5 provided that at least one of x and y is at least 1; and a phenolic antioxidant, the composition and/or the secondary arylamine being a liquid at ambient conditions substantially free from diphenylamine and/or from lower alkylated diphenylamine antioxidants.

By way of contrast and illustrative of the many different approaches which may be taken in relation to solving the problems of scorch reduction, WO2017037204 concerns the use of amine-free stabilising compositions comprising a first derivatised phenolic antioxidant comprising one or more phenolic compounds having the structure of the following formula:

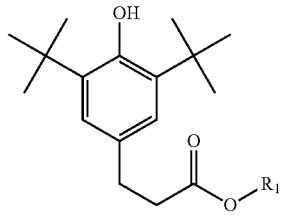

wherein $R_1$ is a linear or branched alkyl group having from 12 to 20 carbon atoms; and one or more second phenolic antioxidants independently selected from a mono-hydroxybenzene having lower steric hindrance than the first derivatised phenolic antioxidant; a di-hydroxybenzene; and/or a tri-hydroxybenzene.

Another alternative considered in the prior art is a stabilising composition having a phenolic antioxidant and a benzofuranone component such as those disclosed in EP 1291384. The benzofuranone component acts as a 'booster' i.e. a component which improves the scorch performance of the stabilising composition beyond the base stabilisation of the phenolic component. However, such benzofuranone components are expensive. Thus, there is a demand for lower-cost alternatives.

Another alternative considered in the prior art is a stabilising composition comprising a phenolic antioxidant in combination with 4-tertbutyl catechol. Thus, U.S. Pat. No. 6,676,849 discloses a scorch inhibitor composition for use as an additive in the manufacture of polyurethane foams, comprising: a derivatised di-tert-butyl phenol substituted with an aromatic, aliphatic or aromatic-aliphatic moiety of $C_2$ or greater, the moiety optionally possessing combinations of heteroatoms, which optionally may be dimerized; 4-tert-tbutyl catechol; and optionally phenothiazine.

US20110230579 discloses a scorch inhibitor composition for polyurethane foams composed of (a) one or more derivatized phenolic compounds in an amount of about 60-80% by weight; (b) one or more aromatic amines in the form of a liquid in an amount of about 15-35% by weight; (c) an alkyl-substituted hydroquinone in an amount of about 4-8% by weight, and (d) phenothiazine at 0 to about 1.0% by weight. The formulations of this disclosure perform poorly with respect to VDA 278 which is an industry standard test protocol for measuring the presence of volatile compounds (VOC and FOG).

EP0574651B1 is a disclosure dating back to 1993 which at the time led to the commercialisation of VANOX™ 945 (a blend of 25% of the derivatised phenolic designated by CAS 6683-19-8 and commercially available at present under the trade designation ANOX™ 20, 65% of a mixture of derivatised arylamines (a reaction product of diphenylamine, diisobutylene and isobutylene) designated by CAS 68411-46-1 and commercially available at present under the trade designation NAUGARD™ PS30, 1% phenothiazine and 9% process oil) which at the time was considered to be an effective liquid antioxidant package for low to medium density polyurethane foam. The formulation is efficient at preventing the discolouration of the foam because of scorch. However, the formulation is highly emissive due to the presence of relatively large amounts (65% w/w) of the material now commercially available under the trade designation NAUGARD™ PS30 which has been referred to previously herein.

U.S. Pat. No. 9,481,775 discloses the use of LOW-INOX™ AH25 (CAS 79-74-3—an alkyl substituted hydroquinone) in combination with a lactone.

U.S. Pat. No. 4,444,676 discloses polyoxyalkylene polyether polyols stabilised by incorporating therein a stabilising composition containing (1) a mixture of butylated phenols consisting of 2-tertiary butyl phenol, 3,5-ditertiary butyl-4-hydroxyhydrocinnamate and 1,6-hexamethylene bis (3,5-ditertiary-butyl-4-hydroxxyhydrocinnamate) or tetrakis [methylene(3,5-ditertiary-butyl-4-hydroxyhydrocinnamate)] methane (2) a p,p'-dialkyldiphenylamine such as p,p'-dioctyldiphenylamine and (3) a phenothiazine compound.

U.S. Pat. Nos. 4,275,173 and 4,265,783 disclose polyurethane foams prepared from polyols stabilised with a combination of a sterically hindered phenol and 4,4'-bis-($\alpha,\alpha$-dimethylbenzyl)diphenyl amine in which a portion of either the phenol or the amine or a portion of both have been replaced with a phenothiazine compound.

U.S. Pat. No. 4,010,211 discloses polyether polyols and polyurethane foams stabilised by a mixture of 2,6-di-tert-butyl-4-methyl phenol (BHT), a disubstituted diphenyl amine, and a selected phenothiazine compound. The physical form of the blends disclosed are all solid at ambient conditions.

However, such stabilising compositions tend to be highly emissive, in particular with regard to volatile organic compounds (VOC). There is now a strong demand, particularly from the automotive industry, to reduce the amount of VOC emissions from stabilising composition. Similar issues pertain to organic compounds of rather lower volatility (FOG) which cause fogging as referenced hereinabove. Particular problems arise in connection with low or very low density foams which are more susceptible to scorch than medium and high density foams.

Thus, there remains a need for antioxidant stabilising compositions which overcome the above-identified problems associated with the prior art compositions, and which satisfy the requirements of an antioxidant stabilising composition with regard to shelf-life, sensitivity to hydrolysis, in-process stabilisation, scorch protection, colour properties, volatility and protection against light and pollutant gases. In connection with low and very low density foams there is a particular need to provide an improved antioxidant composition which is non or low-emissive and yet effective in preventing scorch.

There is a further need for improved antioxidant compositions, in particular liquid antioxidant compositions, which provide effective stabilisation and at the same time avoid or reduce VOC and fogging.

According to a first aspect of the present invention there is provided a stabilising composition for polymeric materials, comprising:
  a. a first derivatised phenolic antioxidant;
  b. at least one secondary arylamine having the formula I:

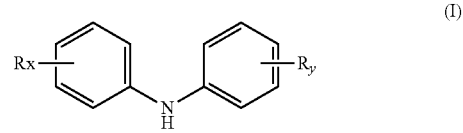

wherein:
    the or each R, which may be the same or different, independently denotes an optionally substituted hydrocarbyl group; x and y are each independently from 0 to 5 provided that at least one of x and y is at least 1; and provided that at least one R is an optionally substituted hydrocarbyl group having at least 9 carbon atoms; and
  c. one or more antioxidant boosters independently selected from:
    i. a second derivatised phenolic antioxidant having lower steric hindrance than the first derivatised phenolic antioxidant;
    ii. a hindered amine; and/or
    iii. an optionally substituted phenothiazine.

It will be seen that the inventive composition essentially comprises three components, namely:
  a first derivatised phenolic antioxidant;
  at least one secondary arylamine according to formula I; and
  an antioxidant booster in accordance with the above.

Preferred stabilising compositions in accordance with the invention comprise these components in the weight ratios:
  first derivatised phenolic antioxidant: 20 to 60% w/w, preferably 25 to 55% w/w, more preferably 30 to 50% w/w.
  at least one secondary arylamine according to formula I: 35 to 75% w/w, preferably 40 to 70% w/w, more preferably 45 to 65% w/w.
  an antioxidant booster in accordance with the above: 0.25 to 20% w/w, preferably 0.5 to 15% w/w, more preferably 0.7 to 11% w/w, most preferably 1 to 10% w/w.

For the avoidance of doubt this specification expressly contemplates stabilising compositions in accordance with the invention in which one of these components is provided in the composition in any of the above stated weight ratios in combination with the other two components in any of their above stated weight ratios. No such combination is disclosed in the prior art, and the inventive composition has as will be seen below significant advantages with respect to VOC and FOG over prior art compositions.

The essential elements of the invention will now be particularised.

The First Derivatised Phenolic Antioxidant

The first derivatised phenolic antioxidant may comprise a single compound or a blend of two or more compounds.

Any such compounds may comprise one or more phenolic compounds being sterically hindered by substituent groups at the 2- and/or 6-positions with respect to the —OH moiety of the phenol group.

The substituent groups at the 2- and/or 6-positions may be straight or branched chain alkyl groups such as methyl, ethyl, propyl, n-butyl, t-butyl and amyl.

Particularly preferred are t-butyl groups.

Preferably both the 2- and 6-positions carry substituent groups, preferably the same substituent group at each of the 2- and 6-positions The first derivatised phenolic antioxidant may be further derivatised at the 3-, 4- and/or 5-positions.

Derivatisation at the 4-position may be with an ester group, preferably an alkyl ester group, preferably an alkyl propionate.

of tetrakismethylene (3,5-di-t-butyl-4-hydroxyhydrocinnamate) methane (ANOX™ 20—CAS 6683-19-8); octadecyl-3-(3',5'-di-t-butyl-4'-hydroxyphenyl) propionate (ANOX™ PP18—CAS 2082-79-3); 1,3,5-tris(3,5-di-t-butyl-4-hydroxybenzyl) isocyanurate (ANOX™ 14—CAS 27676-62-6); N,N'-hexamethylene bis[3-(3,5-di-t-butyl-4-hydroxyphenyl)propionamide] (LOWINOX™ HD98—CAS 23128-74-7); 1,2-bis(3,5-di-t-butyl-4-hydroxyhydrocinnamoyl)hydrazine (LOWINOX™ MD24—CAS 32687-78-8); the butylated reaction product of p-cresol and dicyclopentadiene (LOWINOX™ CPL—CAS 68610-51-5); 2,2'-ethylidenebis[4,6-di-t-butylphenol](ANOX™ 29—CAS 35958-30-6); 2,2'thiodiethylene bis[3(3,5-di-t-butyl-4-hydroxyphenyl)propionate] (ANOX™ 70—CAS 41484-35-9); C13-C15 linear and branched alkyl esters of 3-(3'5'-di-t-butyl-4'-hydroxyphenyl) propionic acid (ANOX™ 1315—CAS 171090-93-0); 1,3,5-trimethyl-2,4,6-tris(3,5-di-t-butyl-4-hydroxybenzyl)benzene (ANOX™ 330—CAS 1709-70-2); triethyleneglycol-bis-[3-(3-t-butyl-4-hydroxy-5-methylphenyl)propionate] (LOWINOX™ GP45—CAS 36443-68-2); 2,2'-oxamidobis[ethyl-3-(3,5-di-t-butyl-4-hydroxyphenyl)propionate](NAUGARD™ XL-1—CAS 70331-94-1); n-hexadecyl-3,5-di-tert-butyl-4-hydroxybenzoate (CYASORB™ UV 2908—CAS 67845-93-6); a bisphenolic stabiliser of formula (II) wherein n is 1, 2, 3, 4, 5, 6, 7, 8, 9, 10 or 11 (IRGANOX™ 2000); and/or compatible mixtures of two or more thereof.

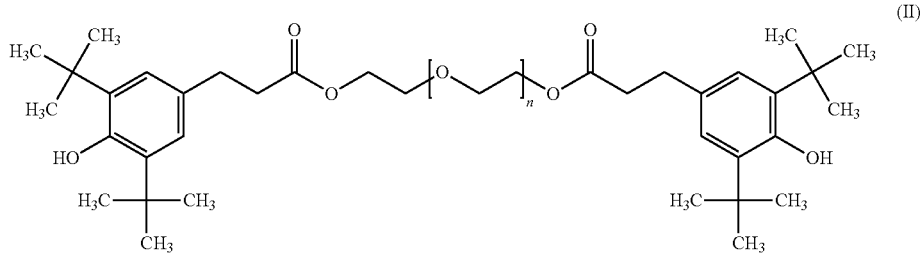

(II)

The phenolic antioxidants provided in the stabilising composition of the invention are selected such that the stabilising composition is liquid at ambient conditions as described above.

The phenolic antioxidant may have a molecular weight at least about 390, at least about 400, at least about 410, at least about 420, at least about 430, at least about 440, at least about 450, at least about 460, at least about 470 or at least about 480.

In this specification all molecular weights are expressed as Daltons and in relation to polymeric materials as the number average molecular weight.

The phenolic antioxidant may not necessarily comprise a single material but preferably comprises a suitable blend of materials, for example selected to provide complementary properties in terms of, for example, liquidity, and low emissivity. In that case it may be possible to include in the blend one or more phenolic antioxidants which are not themselves liquid at ambient conditions but which nevertheless may be blended with one or more other compatible liquid antioxidants to yield a blend which is itself liquid at ambient conditions. Again, it may be preferable for such phenolic antioxidants to have a molecular weight of at least about 390.

By way of specific and non-limiting example, phenolic antioxidants may for example be selected from one or more One particularly preferred phenolic antioxidant comprises C13-C15 linear and branched alkyl esters of 3-(3'5'-di-t-butyl-4'-hydroxyphenyl) propionic acid (ANOX™ 1315—CAS 171090-93-0).

Another particularly preferred first derivatised phenolic antioxidant comprises tetrakismethylene (3,5-di-t-butyl-4-hydroxyhydrocinnamate) methane (ANOX™ 20—CAS 6683-19-8).

A further particularly preferred first derivatised phenolic antioxidant comprises 2,2'-thiodiethylene bis[3-(3,5-di-t-butyl-4-hydroxyphenyl)propionate] (ANOX™ 70—CAS 41484-35-9).

Preferred combinations comprise ANOX™ 1315 with ANOX™ 20 and ANOX™ 1315 with ANOX™ 70.

When the first derivatised phenolic antioxidant comprises more than one compound, it is possible for the blend to be a liquid even though one or more of the individual components is not. For example, ANOX™ 20 is a solid at ambient conditions but is capable of forming liquid blends together with ANOX™ 1315.

In the case where liquid and non-liquid constituents are blended together to form a liquid composition (as may be the case with ANOX™ 1315 and ANOX™ 20) it should be noted that in many cases certain ratios only will produce liquid blends. However, even solid blends may become liquid compositions in the final antioxidant formulation of the invention, which includes also the arylamine and the booster.

It will be apparent that in a stabilising composition according to the invention which comprises three or more phenolic compounds it may be possible for more than one of them to be considered as a booster in accordance with the invention, and in circumstances where a compound has been described herein as a selectable material for the first derivatised phenolic antioxidant, that material may also or instead be regarded as a booster if it has lower steric hindrance than another material in the composition which may be designated as the first derivatised phenolic antioxidant.

Advantageously, the first derivatised phenolic antioxidant has a low contribution to VOC and FOG. The first derivatised phenolic antioxidant may have a lower contribution to VOC and FOG than other known phenolic antioxidants, for example 2,6-di-tert-butyl-4-sec-butylphenol (ISONOX™ 132—CAS 17540-75-9), 2,6-di-tert-butyl-4-nonylphenol (ISONOX™ 232—CAS 4306-88-1), and benzenepropanoic acid, 3,5-bis(1,1-dimethyl-ethyl)-4-hydroxy-, C7-C9 branched alkyl esters (IRGANOX™ 1135—CAS 125643-61-0).

The contribution to VOC of the first derivatised phenolic antioxidant may be less than about 10 ppm, less than about 5 ppm, less than about 2 ppm, or less than about 1 ppm. The contribution to FOG of the first derivatised phenolic antioxidant may be less than about 100 ppm, less than about 50 ppm, less than about 20 ppm, or less than about 10 ppm.

The values for contribution to VOC and FOG are determined according to standard test method VDA 278 for a polyurethane foam.

The polyurethane foam may have been formed by a process with the following parameters:
  i. a polyol having a molecular weight of about 3000, for example VORANOL™ 8010;
  ii. 2.5 php water for a target polyurethane foam density of 35-40 kg/m$^3$;
  iii. isocyanate having an isocyanate index of 105.

The polyurethane foam may have been formed by a process as outlined in the examples under 'Preparation of High Density (40 kg/m$^3$) Foams for VDA 278'.

The stabilising composition of the invention is preferably substantially free from reagent phenolic compound(s) i.e. phenolic compounds used in the manufacture of the first derivatised phenolic antioxidant. In particular, the stabilising composition of the invention is preferably substantially free from methyl 3-(3,5-di-tert-butyl-4-hydroxyphenyl)propionate (CAS 6386-38-5).

In this context, by "substantially free" it is meant the reagent phenolic compound(s) is present, if at all, in an amount of less than 0.2% w/w of the first derivatised phenolic antioxidant.

By limiting the amount of reagent phenolic compound(s) in the stabilising composition, the contribution to VOC and/or FOG is minimised.

The Secondary Arylamine According to Formula I

In accordance with the invention at least one optionally substituted hydrocarbyl group in the compound of formula (I) has at least 9 carbon atoms.

Preferably the at least one optionally substituted hydrocarbyl group comprises 9 carbon atoms. More preferably the secondary arylamine is nonylated.

The stabilising composition of the invention is preferably substantially free from diphenylamine and from lower alkylated diphenylamine antioxidants. For example, the stabilising composition may be substantially free from t-butylated diphenylamines.

By "lower alkylated diphenylamine" we mean preferably materials having the same general structure set out in formula I, except in which preferably x=y=1 and wherein R represents a lower hydrocarbyl group (each R being the same or different); "lower" in this connection meaning $C_4$ and below, $C_3$ and below, $C_2$ and below or $C_1$.

In formula I, and provided that at least one of x and/or y is more than zero, x and y are preferably each independently from 0 to 4, more preferably from 0 to 3, still more preferably from 0 to 2, and most preferably from 0 to 1. Consequently, the secondary arylamine may comprise a monoalkylated secondary arylamine, a dialkylated secondary arylamine, a trialkylated secondary arylamine, or a mixture of two or more thereof. Often, the secondary arylamine useful in the composition of the invention will comprise both mono- and di-alkylated secondary arylamines as a major portion, with a minor portion of trialkylated secondary arylamine also present.

The hydrocarbyl groups may be aliphatic hydrocarbyl groups. Preferably the aliphatic hydrocarbyl groups are selected from alkyl, alkenyl and alkynyl, and may in each case be substituted with other functional groups, or contain other functional linkages, which may include heteroatoms.

More preferably, the hydrocarbyl groups are optionally substituted alkyl groups.

In this specification "alkyl" includes cycloalkyl and both straight and branched chain alkyl.

The or each hydrocarbyl group may comprise an alkaryl or aralkyl group and consequently may include or be substituted with one or more aryl groups, for example phenyl groups.

The stabilising composition of the invention is preferably substantially free from secondary or tertiary arylamines having vapour pressures above 0.03 Pa at 20° C. Diphenylamine for example has a vapour pressure of 0.033 Pa at 20° C.

In this context, by "substantially free" it is meant with respect to an individual component that the component is present (if at all) in an amount of preferably less than 2.0% w/w, more preferably less than 1.5% w/w, still more preferably less than 1.0% w/w, yet more preferably less than 0.5% w/w, and most preferably less than 0.2% w/w of the stabilising composition. Alternatively, we mean that the total amount of any such components is less than 2.0% w/w, more preferably less than 1.5% w/w, still more preferably less than 1.0%, yet more preferably less than 0.5% w/w, and most preferably less than 0.2% w/w of the stabilising composition.

When only one R group is present on an aromatic ring in formula I, that R group is preferably provided in the position ortho or para to the amine linkage.

The upper limit to the number of carbon atoms in the hydrocarbyl group of the secondary arylamine of formula I depends on the requirement for the stabilising composition to be a liquid at ambient conditions and may depend on the practical availability of materials. One particularly preferred secondary arylamine contains a mixture of mono-, di- and tri-nonylated diphenylamine.

Other secondary arylamines may be present in the blend of the invention but when present are preferably selected with regard to their volatility to avoid the aforementioned problem of fogging, and also to ensure that the stabilising composition is a liquid.

Without wishing to be bound by theory, it is believed that lower molecular weight and/or more volatile compounds may be responsible for fogging. Many antioxidant products and indeed other additives are nominally referred to as a particular compound but often contain a mixture of compounds. For example, commercial products such as NAUGARD™ PS30 comprise mixtures of octylated and butylated diphenylamines, including monobutylated diphenylamines. It is thought that monobutylated diphenylamine in particular gives rise to fogging problems.

The presence of a range of compounds can be due to the preparation processes, for example as described in U.S. Pat. No. 4,824,601.

The arylamine may also be capable of dissolving any one or more of the boosters. This is particularly advantageous where one or more of the boosters is in solid form, since overall a liquid stabilising composition can be achieved. This may be more easily dispersed within a polymer, for example a polyol and/or polyurethane.

The Antioxidant Booster

Boosters according to the present invention may include a second derivatised phenolic antioxidant having lower steric hindrance than the first derivatised phenolic antioxidant. In this case either the number of substituent groups ortho to the or a phenolic moiety in the second derivatised phenolic antioxidant is lower than the number of substituent groups ortho to the or a phenolic moiety in the first derivatised phenolic moiety or that the size of any substituent group ortho to the or a phenolic moiety in the second derivatised phenolic antioxidant is smaller than the size of any substituent group ortho to the or a phenolic moiety in the first derivatised phenolic moiety, or both.

The second derivatised phenolic antioxidant may have a molecular weight lower than about 600. The second derivatised phenolic antioxidant may have a molecular weight of about 550 or lower, about 500 or lower, about 480 or lower, about 470 or lower, about 460 or lower, about 450 or lower, about 440 or lower, about 430 or lower, about 420 or lower, about 410 or lower, about 400 or lower, about 390 or lower, about 380 or lower, about 370 or lower, or about 360 or lower.

The one or more second derivatised phenolic antioxidant may be a mono-hydroxybenzene, a di-hydroxybenzene, and/or a tri-hydroxybenzene.

The one or more second phenolic antioxidants are believed to increase the activity of the stabilising composition, in particular with regards to scorch protection. Thus, the one or more second phenolic antioxidants may be referred to as phenolic 'booster' antioxidant/component.

The one or more second phenolic antioxidants may be optionally substituted.

The mono-hydroxybenzene may be a monomer, a dimer or an oligomer.

The mono-hydroxybenzene dimer may be a bridged bisphenol, for example a sulphur-bridged bisphenol or a $CR_2$-bridged bisphenol. Sulphur-bridged bisphenols may include 4,4'-thiobis(2-t-butyl-5-methylphenol) (LOWINOX™ TBM-6—CAS 96-69-5); and 2,2'-thiobis(6-t-butyl-4-methylphenol) (LOWINOX™ TBP-6—CAS 90-66-4). The mono-hydroxybenzene may also be selected from α-tocopherol; 2,2'-methylenebis(6-t-butyl-4-methylphenol) (LOWINOX™ 22M46—CAS 119-47-1); 4,4'-butylidenebis[2-t-butyl-5-methylphenol] (LOWINOX™ 44B25—CAS 85-60-9); 2,2'-methylenebis(6-nonyl-p-cresol) (NAUGAWHITE™—CAS 7786-17-6).

Preferably, the di-hydroxybenzene is selected from 4-tert-butylcatechol (4-TBC); 2,5-di-tert-amyl-hydroquinone (LOWINOX™ AH25—CAS 79-74-3); 2,5-di-tert-butyl-hydroquinone.

The tri-hydroxybenzene may be a pyrogallol i.e. where the hydroxy groups are positioned at the 1, 2 and 3 positions on the benzene ring; or a hydroxyquinol i.e. where the hydroxy groups are positioned at the 1, 2 and 4 positions on the benzene ring.

Preferably, the tri-hydroxybenzene is selected from benzene-1,2,3-triol (pyrogallol); propyl 3,4,5-trihydroxybenzoate (propyl gallate); and/or benzene-1,2,4-triol (hydroxyquinol).

Other low hindered phenolics such as butylated hydroxyl anisole (EMBANOX™ BHA—CAS 25013-16-5) may also be mentioned as examples of boosters in accordance with the invention.

The one or more second phenolic antioxidants may be present in an amount of from about 1 to about 50 wt. % based on the total weight of the stabilising composition.

Preferably, the one or more second phenolic antioxidants are present in an amount of from about 0.1 to about 45 wt. %; from about 0.2 to about 40 wt. %; from about 0.3 to about 35 wt. %; from about 0.4 to about 30 wt. %; from about 0.5 to about 25 wt. %; from about 0.6 to about 20 wt. %; or from about 1 to about 10 wt. %, based on the total weight of the stabilising composition.

By using the one or more second phenolic antioxidants in a relatively small amount in the stabilising composition, the contribution of the second phenolic antioxidant(s) to VOC and FOG is minimalised.

Boosters according to the invention may also or alternatively include hindered amines.

The hindered amine may comprise a hindered amine light stabilizer (HALS).

The HALS may comprise one or more 2,2,6,6-tetramethyl-piperidinyl groups, optionally wherein the nitrogen atom is substituted, for example with a methyl group.

By way of specific and non-limiting example, HALS may for example be selected from one or more of: a mixture of bis(1,2,2,6,6-pentamethyl-4-piperidinyl) sebacate and methyl(1,2,2,6,6-pentamethyl-4-piperidinyl) sebacate (LOWILITE™ 92—CAS 41556-26-7 and 82919-37-7); 1,2,2,6,6-pentamethyl-4-piperidinol (CAS 2403-89-6); and/or mixtures thereof.

The HALS may be LOWILITE™ 92 (CAS 41556-26-7 and 82919-37-7).

Other suitable boosters are found to be phenothiazine (CAS 92-84-2); 2-chlorophenothiazine (CAS 92-39-7); 2-methoxyphenothiazine (CAS 1771-18-2); 2-acetylphenothiazine (CAS 6631-94-3); 2-methylthiophenothiazine (CAS 7643-08-5).

The stabilising composition is preferably a liquid at ambient conditions i.e. at atmospheric pressure (101.325 kPa) and a temperature of 25° C. This may provide the advantage of the stabilising composition being easily mixed with a polyol and/or a polyurethane.

The inventors of the present invention have developed a stabilising composition combining a low-emissive first derivatised phenolic antioxidant, a substituted secondary arylamine and one or more boosters which enhance the activity of the stabilising composition. Overall, the stabilising composition of the present invention has a low contribution to VOC and FOG and provides a high level of scorch protection. It has surprisingly been found that the contribution to VOC and FOG is significantly lower than the prior art stabilising compositions.

The stabilising composition according to the present invention is particularly effective at stabilising polyols and/or polyurethanes. The polyol and/or polyurethane may be stabilised against oxidative, thermal and/or radiation (for example light e.g. UV light) induced degradation.

The polyol may, for example, comprise a polyether polyol and/or a polyester polyol. The polyol may be a precursor for a polyurethane.

The polymeric materials may be for example polyether polyols used in the production of polyurethanes, for example flexible and semiflexible polyurethane foams, or polyurethanes themselves.

The polyurethane may comprise a polyurethane foam.

The amount of stabilising composition in the stabilised composition may be from about 0.01 to about 10%; from about 0.01 to about 5%; from about 0.01% to about 3.5%; or from about 0.01 to about 2% by weight of the polyol and/or polyurethane.

Advantageously, the stabilising compositions of the present invention have a low contribution to volatile organic compounds (VOC) and condensable emissions (FOG). The contribution to VOC of the stabilising composition may be preferably less than 20 ppm, more preferably less than 15 ppm, still more preferably less than 10 ppm, and most preferably less than 5 ppm. The contribution to FOG of the stabilising composition may be preferably less than 200 ppm, more preferably less than 150 ppm, still more preferably less than 120 ppm, and most preferably less than 100 ppm.

The values for contribution to VOC and FOG are determined according to standard test method VDA 278 for a polyurethane foam.

The polyurethane foam may have been formed by a process with the following parameters:
i. a polyol having a molecular weight of about 3000, for example VORANOL™ 8010;
ii. 2.5 php water for a target polyurethane foam density of 35-40 kg/m$^3$;
iii. isocyanate having an isocyanate index of 105.

The polyurethane foam may have been formed by a process as outlined in the examples under 'Preparation of High Density (40 kg/m$^3$) Foams for VDA 278'.

In addition, the stabilising compositions of the present invention have a high level of scorch protection. We have found these to be particularly effective in stabilising low density foams which are intrinsically more susceptible to scorch than higher density foams. By "low density foams" it is meant that the density of the foam is less than 30 kg/m$^3$, more preferably less than 25 kg/m$^3$. By "higher density foams" it is meant that the density of the foam is greater than 30 kg/m$^3$, more preferably greater than 35 kg/m$^3$. The compositions of the invention are able to provide effective scorch prevention in such systems whilst not suffering unacceptably from high VOC and FOG.

According to a second aspect of the present invention there is provided a stabilised composition comprising a polyol and the above-mentioned stabilising composition.

According to a third aspect of the present invention there is provided stabilised composition comprising a polyurethane and the above-mentioned stabilising composition.

According to a fourth aspect of the present invention there is provided a process comprising incorporating or applying the above mentioned stabilising composition to a polyurethane or its precursor(s).

According to a fifth aspect of the present invention there is provided a process for producing a polyurethane, comprising adding the above-mentioned stabilising composition to a polyol and subsequently reacting with isocyanate to form a polyurethane.

According to a sixth aspect of the present invention there is provided the use of the above-mentioned stabilising composition for stabilising a polyol or polyurethane.

The stabilisation may be against oxidative, thermal and/or radiation (e.g. light, e.g. UV light) induced degradation.

According to a seventh aspect of the present invention there is provided a method for reducing scorch in a polyurethane foam, comprising incorporating or applying the above mentioned stabilising composition to a polyurethane foam or its precursor(s).

The invention will now be more particularly described with reference to the following non-limiting examples.

EXAMPLES

The individual components of the stabilising compositions investigated herein are outline in Table 1 below. Hereinafter, the stabilising components will simply be referred to using the name given in the 'component' column.

TABLE 1

| Component | CAS No. | Description |
|---|---|---|
| AO 945 | 6683-19-8<br>68411-46-1<br>92-84-2<br>64742-52-5 | a prior art blend of 25% ANOX ™ 20 (a derivatised phenolic), 65% NAUGARD ™ PS30 (a mixture of derivatised arylamines and a reaction product of diphenylamine, diisobutylene and isobutylene), 1% phenothiazine and 9% process oil |
| A1315 | 171090-93-0 | ANOX ™ 1315 - C13-C15 linear and branched alkyl esters of 3-(3'-5'-di-t-butyl-4'-hydroxylphenyl) propionic acid with ANOX ™ PP-BASE (CAS 6386-38-5) content of <2000 ppm |
| A20 | 6683-19-8 | ANOX ™ 20 - Tetrakismethylene(3,5-di-t-butyl-4-hydroxyhydrocinnamate) methane |
| A70 | 41484-35-9 | ANOX ™ 70 - 2,2' Thiodiethylenebis[3-(3,5-di-t-butyl-4-hydroxyphenyl)propionate] |
| PS30 | 68411-46-1 | NAUGARD ™ PS30 - Diphenylamine C4/C8 reaction product |
| PTZ | 92-84-2 | Phenothiazine |
| Nonyl.DPA | 36878-20-3 | NAUGALUBE ™ 438L - A mixture of mono-nonyl and di-nonyl diphenylamines with a DPA (diphenylamine) content <1000 ppm and a colour < Gardner 5 |

TABLE 1-continued

| Component | CAS No. | Description |
|---|---|---|
| Process oil | 64742-52-5 | NYNAS ™ base stock 130 OIL available from Nynas AB Lindetorpsvägen 7, Stockholm, Sweden |
| TBM-6 | 96-69-5 | LOWINOX ™ TBM-6 - 4,4'-thiobis(2-t-butyl-5-, methylphenol) |
| AH25 | 79-74-3 | LOWINOX ™ AH25 - 2,5-di-tert-amyl-hydroquinone |
| TBC | 98-29-3 | Tert-Butyl Catechol |
| L92 | 41556-26-7 | LOWILITE ™ 92 - Hindered Amine Light Stabilizer - mixture of decanedioc acid, bis (1,2,2,6,6-pentamethyl-4-piperidinyl) and decanedioc acid, methyl 1,2,2,6,6-pentamethyl-4-piperidinyl ester |

A number of stabilising compositions were prepared simply by blending the individual components in the amounts (all w/w) referenced in Table 2:

TABLE 2

| Example | A20 | A1315 | A70 | PS30 | Nonyl.DPA | Booster | Process Oil |
|---|---|---|---|---|---|---|---|
| A | 25.0% | 0% | 0% | 65.0% | 0% | 1.0% PTZ | 9.0% |
| B | 36.0% | 10.0% | 0% | 0% | 54.0% | 0% | 0% |
| 1 | 30.0% | 10.0% | 0% | 0% | 59.0% | 1.0% PTZ | 0% |
| 2 | 34.0% | 10.0% | 0% | 0% | 51.0% | 5.0% TBM-6 | 0% |
| 3 | 25.5% | 10.0% | 0% | 0% | 59.5% | 5.0% AH25 | 0% |
| 4 | 29.0% | 10.0% | 0% | 0% | 51.0% | 10% TBC | 0% |
| 5 | 30.0% | 20.0% | 0% | 0% | 45.0% | 5.0% L92 | 0% |
| 6 | 0% | 20.0% | 30.0% | 0% | 45% | 5.0% L92 | 0% |
| 7 | 25.0% | 20.0% | 0% | 0% | 45% | 8.0% L92 2.0% TBC | 0% |
| 8 | 40% | 0% | 0% | 0% | 45% | 15% L92 | 0% |
| 9 | 0% | 0% | 40% | 0% | 45% | 15% L92 | 0% |

Example A is comparative and corresponds to the VANOX™ 945 stabilising package known in the art. Example B is another comparative example. Examples 1 to 9 are in accordance with the invention.

Each of the stabilising compositions of examples 1 to 9 were observed to be liquid at atmospheric pressure and a temperature of 25° C.

Preparation of Low Density (20-25 kg/m$^3$) Foams for Microwave Scorch and Gas Fading The antioxidant package Example A (0.45 g) was charged to the VORANOL™ 8010 polyol (100 g) in a 1 litre flask. The mixture was homogenised by agitation at 1900 rpm for 1 minute. To this were added a silicone surfactant (Evonik TEGOSTAB™ B8229, 1.1 g), a mixture of amine catalysts (3:1 Dabco 33LV:Dabco BL11, 0.27 g) and deionised water (5 g). The mixture was further agitated for 30 seconds. Tin 2-ethylhexanoate catalyst (ALDRICH™, 0.25 g) was immediately added and the mass agitated for a further 15 seconds. Finally, toluene di-isocyanate (62.7 g) was added in the flask. After mixing for 10 seconds, the solution was quickly poured into an 18 cm×16 cm×16 cm wooden box lined with a Kraft paper mould and the internal temperature monitored.

Microwave Scorch Test

A BP210/50 research microwave (Microwave Research and Applications Inc.) was used for the scorch test. Once the foam had reached its maximum internal temperature, it was immediately removed from the wooden box and placed inside the microwave cavity. The microwave was set to operate at 20% maximum power (approximately 1300 W) for 60 s. After microwave irradiation, the foam was removed from the cavity and cured in a convection oven for 30 minutes at 95° C. When cooled, the foam was cut open and the colour of the maximum scorched area measured.

The above process was repeated but antioxidant package Example A is replaced by Example B, and Examples 1 to 9 in accordance with the invention.

The results of the microwave scorch test are presented in Table 3. The results are normalised relative to that of comparative Example A and presented as ΔE Ex/ΔE A in accordance with the teaching of US20110230579.

TABLE 3

| | ΔE Ex/ΔE A |
|---|---|
| Example A | 1 |
| Example B | 1.5 |
| Example 1 | 0.75 |
| Example 2 | 0.84 |
| Example 3 | 0.26 |
| Example 4 | 0.36 |
| Example 5 | 0.88 |
| Example 6 | 0.90 |
| Example 7 | 0.60 |
| Example 8 | 0.90 |
| Example 9 | 0.90 |

As can be seen, Examples 1 to 9 each outperform the comparative examples in terms of scorch reduction.

Preparation of High Density (40 kg/m$^3$) Foams for VDA 278 The antioxidant package Example A (0.9 g) was charged to VORANOL™ 8010 polyol (200 g) in a 1 litre flask. The mixture was homogenised by agitation at 1900 rpm for 1 minute. To this were added a silicone surfactant (Evonik TEGOSTAB™ B8229, 1.2 g), a mixture of amine catalysts (3:1 Dabco 33LV:Dabco BL11, 0.60 g) and deionised water (5 g). The mixture was agitated for a further 30 seconds. Tin 2-ethylhexanoate catalyst (ALDRICH™, 0.45 g) was immediately added and the mass agitated for a further 15 seconds. Finally, toluene di-isocyanate (72.2 pph) was charged in the flask. After mixing for 10 seconds, the mixture was quickly poured into an 18 cm×16 cm×16 cm wooden box lined with a Kraft paper mould and the internal temperature monitored. Once cured (30 minutes at 95° C.) and cooled to room temperature, the foam was cut to prepare a sample (100*100*25 mm).

The above process was repeated but antioxidant package Example A was replaced by Examples 1 to 5.

VDA 278

Samples were sent to an independent testing centre (SGS Frenesius, Germany) to determine emissions according to VDA 278 method. The results from VDA 278 are collected in Table 4.

TABLE 4

Results from emission test (according to VDA278). Only the emissions relative to the antioxidant package are quoted.

| Emissions (ppm) | Example A | Example 1 | Example 2 | Example 3 | Example 4 | Example 5 |
|---|---|---|---|---|---|---|
| VOC | 26 | 0 | 0 | 0 | 0 | 0 |
| FOG | 237 | 38 | 22 | 86 | 20 | 52 |

As can be seen, Examples 1 to 5 outperform comparative Example A in terms of emissions. The inventive packages have no contributions to VOC (in accordance with the VDA278 method). In terms of FOG all inventive examples show a significantly lower amount of emissions when compared to Example A.

Gas Fading

Foams were manufactured following the process described above. Once cured (30 minutes at 95° C.) and cooled to room temperature, the foams were cut to prepare a sample (100*100*25 mm). The process is repeated for Examples 1 to 5.

Samples were sent to an independent testing centre (Intertek Schweiz, Switzerland) to determine their resistance to discoloration when in contact with nitrous oxide. The test was performed according to AATCC 164. Results are shown in Table 5 below:

TABLE 5

Results from Gas Fading test (according to AATCC 164)

| Time in oven/min | ΔE | | | a* | | | b* | | |
|---|---|---|---|---|---|---|---|---|---|
| | 0 | 30 | 60 | 0 | 30 | 60 | 0 | 30 | 60 |
| Example A | 0.0 | 32.1 | 43.3 | −0.2 | 1.9 | 4.5 | −0.4 | 31.2 | 41.7 |
| Example 1 | 0.0 | 28.0 | 42.6 | −0.3 | 1.9 | 4.5 | −0.3 | 27.0 | 40.9 |
| Example 2 | 0.0 | 27.8 | 40.3 | −0.3 | −0.4 | 1.9 | −0.5 | 26.9 | 39.0 |
| Example 3 | 0.0 | 28.1 | 41.5 | −0.3 | −1.2 | 1.1 | −0.3 | 27.2 | 40.4 |
| Example 4 | 0.0 | 25.4 | 36.2 | −0.2 | −1.4 | 0.3 | −0.6 | 24.5 | 35.1 |
| Example 5 | 0.0 | 29.7 | 40.9 | −0.2 | −1.1 | 1.8 | −0.7 | 28.8 | 39.7 |

As can be seen, all inventive Examples 1 to 5 perform at least as well as the comparative Example A in terms of overall colour (i.e. ΔE) but also in terms of individual colours, i.e. the a* (value representing the colour value on the scale going from green to red) and the b* (going from blue to yellow).

Oxidative Onset Temperature

Polyol was blended with 4500 ppm of the stabilising composition of Examples 1 to 5 and 5 mg of the mixture was placed in an open DSC pan. After an initial stabilisation of the sample at 30° C. under nitrogen, the temperature was increased by 10° C. per minute under oxygen (200 mL/min) from 30 to 300° C.

A further comparative example (Example C) was conducted using the same method but in the absence of any stabilising composition in the polyol.

The oxidative onset temperature was then determined and the results presented in Table 6:

TABLE 6

Oxidative Onset Temperature of inventive and comparative compositions

| | Average OOT (° C.) |
|---|---|
| Example A (comp.) | 202.4 |
| Example C (comp.) | 130.6 |
| Example 1 | 204.2 |
| Example 2 | 202.3 |
| Example 3 | 201.7 |
| Example 4 | 204.7 |
| Example 5 | 201.8 |

As can be seen, all samples containing stabilising composition have a similar OOT and offer significant oxidative protection to the polyol.

The invention claimed is:

1. A stabilising composition for polymeric materials, comprising:
   a. a first derivatised phenolic antioxidant having a molecular weight of at least 390 present in an amount of from 20 to 60% w/w based on the total weight of the stabilising composition;
   b. at least one secondary arylamine having the formula I:

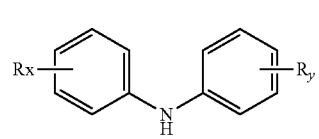

(I)

wherein:
each R, which may be the same or different, independently denotes an optionally substituted hydrocarbyl group; x and y are each independently from 0 to 5 provided that at least one of x and y is at least 1; and provided that at least one R is an unsubstituted cycloalkyl, straight chain alkyl, or branched chain alkyl hydrocarbyl group having at least 9 carbon atoms, wherein the at least one secondary arylamine is present in an amount of from 35 to 75% w/w of the stabilising composition; and c. one or more antioxidant boosters selected from the group consisting of:
   i. a second derivatised phenolic antioxidant having lower steric hindrance than the first derivatised phenolic antioxidant wherein the second derivatized phenolic antioxidant comprises a bridged bisphenol, a di-hydroxybenzene, and/or a tri-hydroxybenzene wherein, the one or more antioxidant boosters is present in an amount of from 0.25 to 15 w/w of the stabilizing composition.

2. The stabilising composition according to claim 1, wherein at least one of $R_x$ and $R_y$ is an optionally substituted hydrocarbyl group having 9 carbon atoms.

3. The stabilising composition according to claim 2, wherein at least one of $R_x$ and $R_y$ is a nonyl group.

4. The stabilising composition according to claim 1, wherein x and y are each independently from 0 to 2 provided that at least one of x and y is at least 1.

5. The stabilising composition according to claim 1, wherein the stabilising composition is substantially free from diphenylamine and from lower alkylated diphenylamine antioxidants.

6. The stabilising composition according to claim 1, wherein the stabilising composition is substantially free from t-butylated diphenylamines.

7. The stabilising composition according to claim 1, wherein the first derivatised phenolic antioxidant has a molecular weight of at least about 400.

8. The stabilising composition according to claim 1, wherein the second derivatised phenolic antioxidant has a molecular weight lower than about 600.

9. The stabilising composition according to claim 1, wherein the second derivatised phenolic antioxidant has:
   a. the number of substituent groups ortho to a phenolic hydroxyl group in the second derivatised phenolic antioxidant is lower than the number of substituent groups ortho to a phenolic hydroxyl group in the first derivatised phenolic antioxidant; and/or
   b. the size of any substituent group ortho to a phenolic hydroxyl group in the second derivatised phenolic antioxidant is smaller than the size of any substituent group ortho to a phenolic hydroxyl group in the first derivatised phenolic antioxidant.

10. The stabilising composition according to claim 1, wherein the second derivatized phenolic antioxidant is selected from the group consisting of, a di-hydroxybenzene, and a tri-hydroxybenzene.

11. The stabilising composition according to claim 1, wherein the composition is a liquid at 25° C. and atmospheric pressure.

12. The stabilising composition according to claim 1, wherein the stabilising composition is substantially free from secondary or tertiary arylamines having vapour pressures above 0.03 Pa at 20° C.

13. The stabilising composition according to claim 12, wherein the secondary or tertiary arylamines having vapour pressures above 0.03 Pa at 20° C. are each present in an amount of less than 2.0% w/w of the stabilising composition.

14. The stabilising composition according to claim 13, wherein the total amount of secondary or tertiary arylamines having vapour pressures above 0.03 Pa at 20° C. is less than 2.0% w/w of the stabilising composition.

15. The stabilising composition according to claim 1, wherein the contribution to VOC of the stabilising composition is less than 20 ppm.

16. The stabilising composition according to claim 1, wherein the contribution to condensable emissions of the stabilising composition is less than 200 ppm.

17. The stabilising composition according to claim 1, wherein the first derivatised phenolic antioxidant comprises a phenol group which is substituted.

18. The stabilising composition according to claim 17, wherein the substituted phenol comprises an alkyl substituent.

19. The stabilising composition according to claim 1, wherein the first derivatised phenolic antioxidant is present in an amount of from 25 to 55% w/w.

20. The stabilising composition according to claim 1, wherein the at least one secondary arylamine is present in an amount of from 40 to 70% w/w.

21. A stabilised composition comprising a polyol and a stabilising composition according to claim 1.

22. A stabilised composition comprising a polyurethane and a stabilising composition according to claim 1.

23. The stabilised composition according to claim 21, wherein the stabilising composition is present in the stabilised composition in an amount of from about 0.01 to about 2% by weight of the polymeric material.

24. The stabilised composition according to claim 22, wherein the stabilising composition is present in the stabilised composition in an amount of from about 0.01 to about 2% by weight of the polymeric material.

* * * * *